US009154326B2

(12) United States Patent
Tochio et al.

(10) Patent No.: US 9,154,326 B2
(45) Date of Patent: Oct. 6, 2015

(54) TRANSMISSION APPARATUS, FAILURE RECOVERY METHOD, AND NETWORK SYSTEM

(75) Inventors: Yuji Tochio, Yokohama (JP); Toru Katagiri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 252 days.

(21) Appl. No.: 13/609,745

(22) Filed: Sep. 11, 2012

(65) Prior Publication Data
US 2013/0010591 A1 Jan. 10, 2013

Related U.S. Application Data

(63) Continuation of application No. PCT/JP2010/054890, filed on Mar. 19, 2010.

(51) Int. Cl.
H04L 12/437 (2006.01)
H04L 12/40 (2006.01)

(52) U.S. Cl.
CPC ........ H04L 12/437 (2013.01); H04L 12/40013 (2013.01); *H04Q 2213/1301* (2013.01); *H04Q 2213/13166* (2013.01); *H04Q 2213/13167* (2013.01)

(58) Field of Classification Search
None
See application file for complete search history.

(56) References Cited

U.S. PATENT DOCUMENTS

| 6,850,660 B2 | 2/2005 | Notani |
| 7,065,040 B2 | 6/2006 | Nagamine |
| 7,095,714 B2 | 8/2006 | Suetsugu et al. |
| 7,263,062 B2 | 8/2007 | Chikazawa et al. |
| 7,602,706 B1 * | 10/2009 | Gardo et al. ............ 370/219 |
| 2009/0022052 A1 * | 1/2009 | Yoshimaru ............ 370/223 |
| 2009/0052317 A1 * | 2/2009 | Takagi et al. ........... 370/223 |

FOREIGN PATENT DOCUMENTS

| JP | 2000-13352 | 1/2000 |
| JP | 2002-77208 | 3/2002 |
| JP | 2002-232442 | 8/2002 |
| JP | 2003-18891 | 1/2003 |
| JP | 2003-101559 | 4/2003 |
| JP | 2004-15663 | 1/2004 |
| JP | 2004-266480 | 9/2004 |

OTHER PUBLICATIONS

International Search Report of Corresponding PCT Application PCT/JP2010/054890 mailed Apr. 13, 2010.

* cited by examiner

*Primary Examiner* — Khoa Huynh
(74) *Attorney, Agent, or Firm* — Staas & Halsey LLP

(57) ABSTRACT

An object is to simplify a process performed due to a failure recovery. To realize this object, the transmission apparatus includes a determining unit that determines, when a transmission apparatus receives a frame from each ring in a network including multiple rings in which a part of each ring is shared, whether failure information indicating that a failure has occurred in one of the rings is contained in one of the received frames. The transmission apparatus also includes a mapping unit that maps a frame that is determined by the determining unit to contain the failure information, onto a shared frame that is a frame used in a shared portion in the multiple rings. Accordingly, the process performed due to a failure recovery can be simplified.

9 Claims, 11 Drawing Sheets

TRANSMISSION APPARATUS, FAILURE RECOVERY METHOD, AND NETWORK SYSTEM

CROSS-REFERENCE TO RELATED APPLICATION

This application is a continuation application of International Application PCT/JP2010/054890, filed on Mar. 19, 2010, and designated the U.S., the entire contents of which are incorporated herein by reference.

FIELD

The embodiments discussed herein are directed to a transmission apparatus, a failure recovery method, and a network system.

BACKGROUND

In recent years, with the increased demand for bulk data transmission, large-scale networks using a high-speed digital transmission method has been constructed. The use of the Optical Transport Network (OTN), which is prescribed by International Telecommunication Union Telecommunication standardization sector (ITU-T) Recommendation G.709 as the digital transmission standards, is being studied. The OTN is used to transmit a frame that is a signal in which a signal (overhead) used for maintaining a transmission apparatus or the like is attached to a digitized main signal (pay load).

An example of a method for constructing a large-scale network using the OTN includes a Bi-directional Line Switched Ring (BLSR) method in which, for example, transmission apparatuses are connected in a ring shaped fashion. Some ring networks constructed using the BLSR method uses an automatic protection switching (APS) function for recovering a network when a failure occurs. In the ring network that uses the BLSR method using the APS function (hereinafter, referred to as an "APS/BLSR ring network"), high-speed failure recovery is implemented by transmission apparatuses notifying each other of APS bytes stored in the overhead contained in a frame. For example, in the APS/BLSR ring network, when a signal fail (SF) occurs as a failure, a network is recovered by notifying an adjacent apparatus with information on the network's own apparatus to by using the APS bytes containing the SF and by switching the currently used line to a spare line.

When constructing a large-scale network that is larger than the above, it is preferable to implement a multi-ring configuration in which multiple ring networks are connected with each other. Such a multi-ring configuration as that illustrated in FIG. 11 has been proposed. FIG. 11 is a schematic diagram illustrating a conventional multi-ring configuration. As illustrated in FIG. 11, with the conventional multi-ring configuration, two transmission apparatuses in a ring network A are connected with two transmission apparatuses in a ring network B, respectively.

Patent Document 1: Japanese Laid-open Patent Publication No. 2003-18891
Patent Document 2: Japanese Laid-open Patent Publication No. 2004-266480
Patent Document 3: Japanese Laid-open Patent Publication No. 2003-101559
Patent Document 4: Japanese Laid-open Patent Publication No. 2002-232442

SUMMARY

However, with the conventional multi-ring configuration described above, in addition to sending, in a ring network, the APS bytes as a notification, a switching process is individually performed in the four transmission apparatuses; therefore, there is a problem in that a process performed due to a failure recovery becomes complicated.

To solve the above-described problem and achieve the object, a transmission apparatus disclosed in this application includes a determining unit that determines, when a frame is received from each of a plurality of rings in a network including the plurality of rings in which a part of each of the plurality of rings is shared, whether failure information indicating that a failure has occurred in one of the plurality of the rings is contained in one of the received frames; and a mapping unit that maps the received frame that is determined by the determining unit to contain the failure information onto a shared frame, which is a frame used in the shared part of each of the plurality of rings.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of a transmission apparatus, a failure recovery method, and a network system disclosed in the present invention will be described in detail below with reference to the accompanying drawings.

[a] First Embodiment

Figure 1:
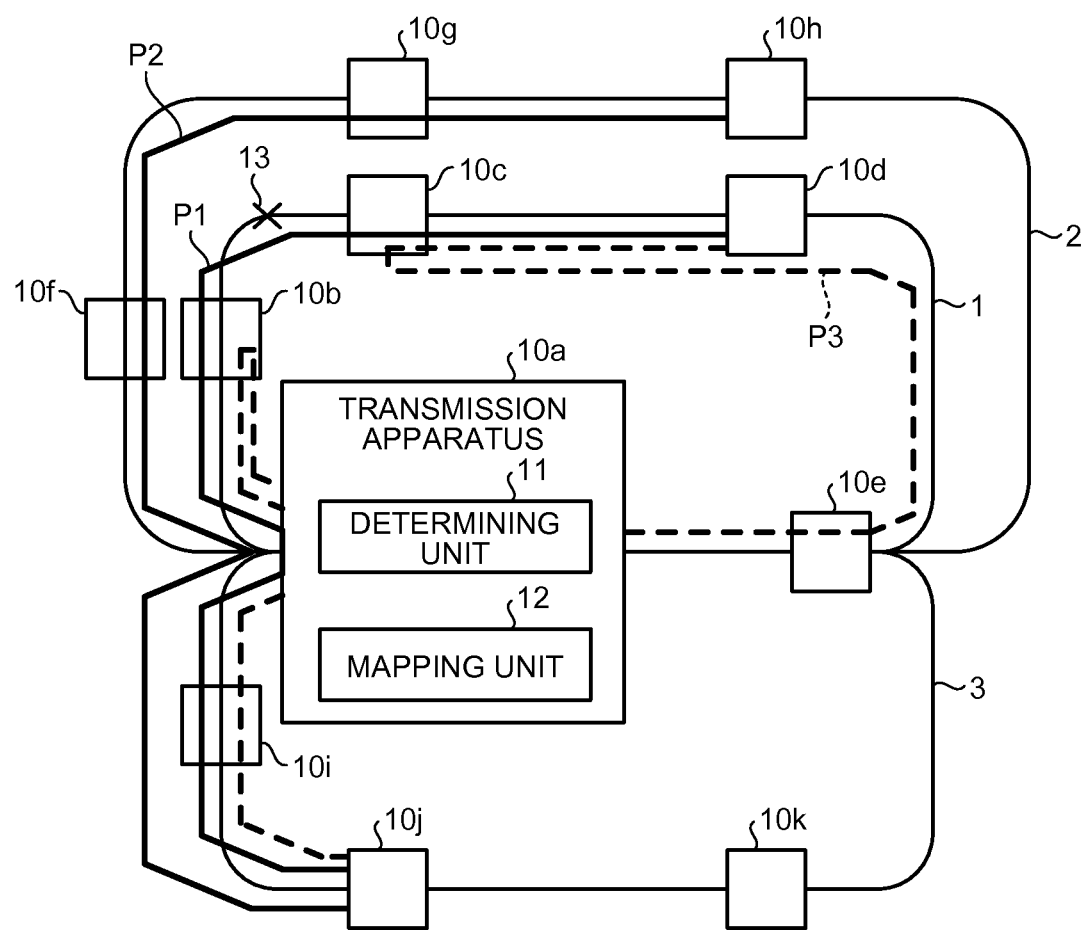
FIG. 1 is a schematic diagram illustrating the configuration of a network that includes transmission apparatuses according to a first embodiment.

First, the configuration of a transmission apparatus according to a first embodiment will be described. FIG. 1 is a schematic diagram illustrating the configuration of a network that includes transmission apparatuses according to a first embodiment. The network illustrated in FIG. 1 has a multi-ring configuration that includes three rings 1 to 3. The ring 1 connects transmission apparatuses 10a, 10b, 10c, 10d, and 10e. The ring 2 connects transmission apparatuses 10a, 10f, 10g, 10h, and 10e. The ring 3 connects transmission apparatuses 10a, 10i, 10j, 10k, and 10e. In the example in FIG. 1, the three rings 1 to 3 and the 11 transmission apparatuses 10a to 10k are illustrated; however, the number of rings or transmission apparatuses is not limited thereto.

Furthermore, in the network illustrated in FIG. 1, the rings 1 to 3 share the sections of the transmission apparatus 10a and the transmission apparatus 10e. Both the transmission apparatus 10a and the transmission apparatus 10e that are arranged in a shared portion are the transmission apparatuses according to the first embodiment. The other transmission apparatuses are known transmission apparatuses used for an APS/BLSR ring network. The transmission apparatus 10a and the transmission apparatus 10e according to the first embodiment have the same configuration; therefore, in the following, only the transmission apparatus 10a will be described as an example.

As illustrated in FIG. 1, the transmission apparatus 10a includes a determining unit 11 and a mapping unit 12. When a frame is received from each of the rings 1 to 3, the determining unit 11 determines whether each of the received frames contains failure information indicating that a failure has occurred in the corresponding ring 1 to 3. The mapping unit 12 maps the frame, which has been determined by the determining unit 11 to contain failure information, onto a shared frame that is a frame used in a shared portion shared by the multiple rings 1 to 3.

In the following, a failure recovery method performed by the determining unit 11 and the mapping unit 12 will be specifically described with reference to FIG. 1. When in the normal operation state, it is assumed that the transmission apparatus 10d in the ring 1 sends and receives a frame to/from the transmission apparatus 10j in the ring 3 by using a route P1 that passes through both the transmission apparatuses 10c, 10b, and 10a in the ring 1 and the transmission apparatuses 10a and 10i in the ring 3. Similarly, it is assumed that the transmission apparatus 10h in the ring 2 sends and receives a frame to/from the transmission apparatus 10j in the ring 3 by using a route P2 that passes through both the transmission apparatuses 10g, 10f, and 10a in the ring 2 and the transmission apparatuses 10a and 10i in the ring 3. In such a state, the determining unit 11 determines whether failure information is contained in a frame received from each of the rings 1 to 3 and determines that the failure information is not contained therein. Because failure information is not contained in the frames received from the rings 1 to 3, the mapping unit 12 does not map these frames onto a shared frame.

In the above example, it is assumed that a failure 13 occurs in the line between the transmission apparatus 10b and the transmission apparatus 10c in the ring 1. When the transmission apparatus 10b and the transmission apparatus 10c detect the failure 13, they add, to a frame, failure information that indicates a failure has occurred in the ring 1; switch the route P1 that has been used until now to the route P3 that is used as a spare and that is arranged on the opposite side; and transmit the frame containing the failure information. In this state in which the failure 13 occurs, the determining unit 11 determines whether failure information is contained in one of the frames received from each of the rings 1 to 3 and then determines that the failure information indicating that a failure has occurred in the ring 1 is contained in a frame received from the ring 1. Then, the mapping unit 12 maps the frame, which has been received from the ring 1 and has been determined by the determining unit 11 to contain the failure information, on a shared frame and transmits the mapped shared frame to the line between the transmission apparatus 10a and the transmission apparatus 10e, which are a shared portion.

Accordingly, the failure 13 that has occurred in the ring 1 is recovered, and thus the transmission apparatus 10d in the ring 1 can resume sending and receiving a frame to/from the transmission apparatus 10j in the ring 3. For example, a frame that is sent from the transmission apparatus 10j in the ring 3 reaches the transmission apparatus 10b in the ring 1 via the transmission apparatuses 10i and 10a, turns back at the transmission apparatus 10b, and returns to the transmission apparatus 10a. Then, a frame sent from the transmission apparatus 10j in the ring 3 is mapped onto a shared frame by the transmission apparatus 10a, and the mapped shared frame is sent from the transmission apparatus 10a to the transmission apparatus 10e. Then, a frame sent from the transmission apparatus 10j in the ring 3 is demapped from the shared frame by the transmission apparatus 10e, reaches the transmission apparatus 10c via the transmission apparatus 10d, turns back at the transmission apparatus 10c, and reaches the transmission apparatus 10d in the ring 1.

As described above, if failure information is contained in a frame that is received from each ring in a network including multiple rings in which a part of each ring is shared, the transmission apparatus 10a according to the first embodiment maps a frame containing the failure information received from a ring onto a shared frame that is used by a shared portion shared by the rings. Accordingly, the transmission apparatus 10a can recover the failure by only using failure information that is stored in the overhead contained in the frame that is existing APS bytes, and thus it is possible to skip the switching process individually performed in the conventional multi-ring configuration. Accordingly, the transmission apparatus 10a simplify the process performed due to a failure recovery.

[b] Second Embodiment

In the following, the transmission apparatus described in the first embodiment will be described using specific examples. In a second embodiment, a description will be given of a case in which the transmission apparatus described in the first embodiment is used in a transmission apparatus that uses the OTN prescribed by ITU-T Recommendation G.709. The OTN is a transmission system that retains data in a frame called an Optical channel Transport Unit (OTU) frame normalized by the ITU-T. In the following, a failure recovery method performed by transmission apparatuses according to the second embodiment will be described first. Then, the configuration of the transmission apparatus according to the second embodiment will be described.

Figure 2:
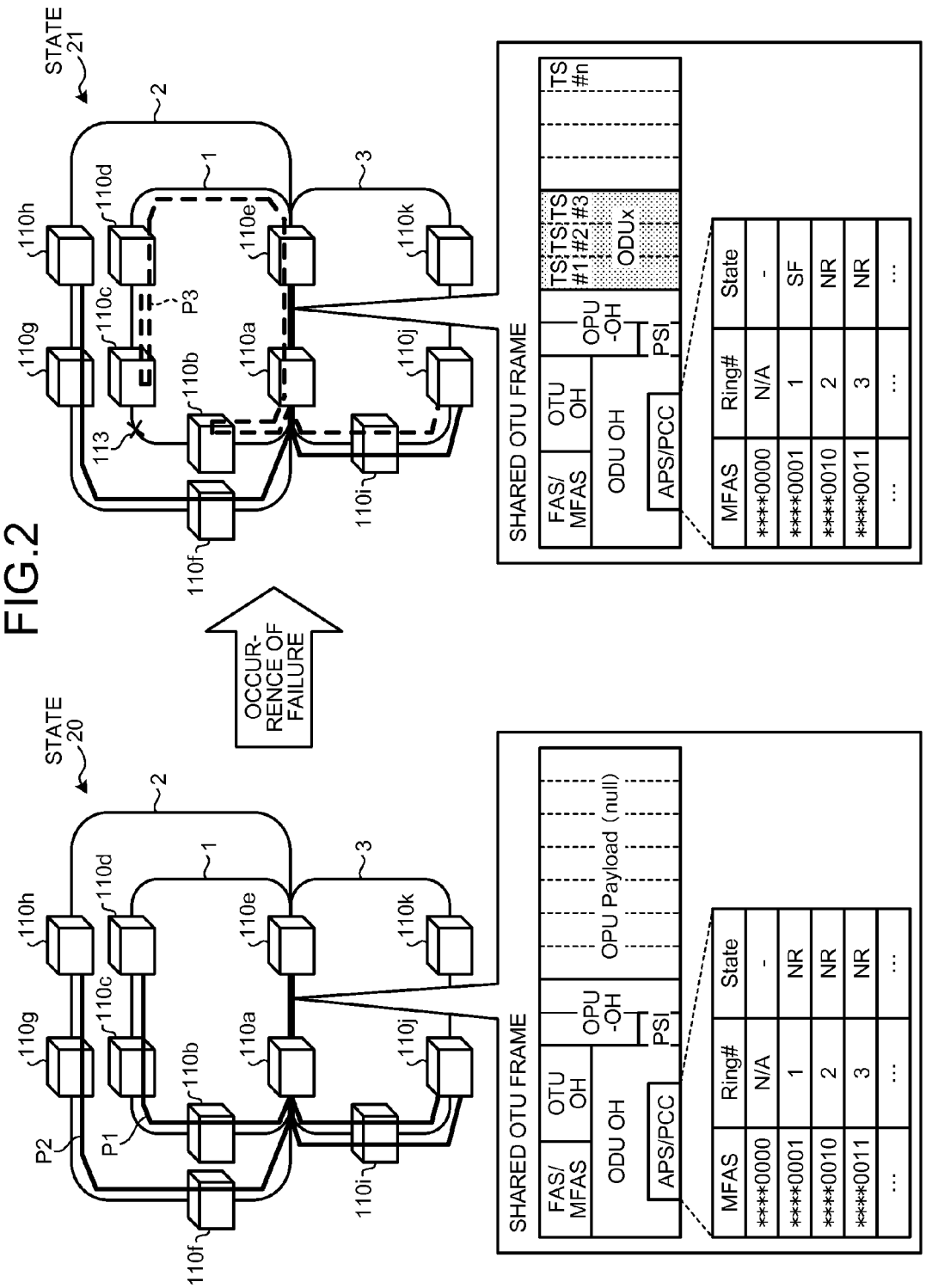
FIG. 2 is a schematic diagram illustrating a failure recovery method performed by transmission apparatuses according to a second embodiment.

First, a failure recovery method performed by a transmission apparatus according to the second embodiment will be described. FIG. 2 is a schematic diagram illustrating a failure recovery method performed by transmission apparatuses according to a second embodiment. The network illustrated in FIG. 2 has a multi-ring configuration that includes three rings 1 to 3. The ring 1 connects transmission apparatuses 110a, 110b, 110c, 110d, and 110e. The ring 2 connects the transmission apparatuses 110a, 110f, 110g, 110h, and 110e. The ring 3 connects the transmission apparatuses 110a, 110i, 110j, 110k, and 110e. In the example in FIG. 1, three rings 1 to 3 and the 11 transmission apparatuses 110a to 110k are illustrated; however, the number of rings or transmission apparatuses is not limited thereto.

Furthermore, in the network illustrated in FIG. 2, the rings 1 to 3 share the sections of the transmission apparatus 110a and the transmission apparatus 110e. Both the transmission apparatus 110a and the transmission apparatus 110e that are arranged in a shared portion are the transmission apparatuses that performs the failure recovery method according to the second embodiment. The other transmission apparatuses are known transmission apparatuses used for an APS/BLSR ring network. The transmission apparatus 110a and the transmission apparatus 110e according to the second embodiment have the same configuration; therefore, in the following, only the transmission apparatus 110a will be described as an example.

In the failure recovery method according to the second embodiment, when failure information is contained in an OTU frame that is received from each ring in a network including a plurality of rings in which a part of each of the plurality of rings is shared, the failure recovery method maps the OTU frame containing the failure information received from the corresponding ring onto an OTU frame that is used by the shared part of each of the plurality of rings.

When in the normal operation state, it is assumed that the transmission apparatus 110d in the ring 1 sends and receives an OTU frame to/from the transmission apparatus 110j in the ring 3 by using a route P1 that passes through both the transmission apparatuses 110c, 110b, and 110a in the ring 1 and the transmission apparatuses 110a and 110i in the ring 3. Similarly, it is assumed that the transmission apparatus 110h in the ring 2 sends and receives an OTU frame to/from the transmission apparatus 110j in the ring 3 by using the route P2 that passes through both the transmission apparatuses 110g, 110f, and 110a in the ring 2 and the transmission apparatuses 110a and 110i in the ring 3. In such a state, the transmission apparatus 110a determines whether failure information is contained in an OTU frame received from each of the rings 1 to 3 and determines that no failure information is contained. Accordingly, the transmission apparatus 110a does not map these OTU frames onto an OTU frame (hereinafter, referred to as "shared OTU frame") that is used by a line between the transmission apparatus 110a and the transmission apparatus 110e, which are a shared portion. Therefore, shared Optical channel Payload Unit (OPU)-Payload in the shared OTU frame is a null, indicating that no data is retained (State 20).

In an Automatic Protection Switching/Protection Communication Channel (APS/PCC) in an Optical Data Unit Overhead (ODU-OH) in a shared OTU frame, a Multi-Frame Alignment Signal (MFAS), a Ring #, and a State are associated with each other. An MFAS indicates the type of OTU frame that is mapped onto a shared OTU frame. A Ring # indicates an identifier for uniquely identifying a ring in which an OTU frame indicated by the MFAS is transmitted. A State indicates the state of a ring identified by the Ring # and contains therein No Request (NR) indicating a normal operation or Signal Fail (SF) indicating signal disconnection. For example, in the normal operation described above, the State of the Ring # "1" (ring 1) in which an OTU frame indicated by the MFAS "****0001" is transmitted is "NR" (normal operation).

In the above example, it is assumed that a failure 113, such as an SF occurs in a line between the transmission apparatus 110b and the transmission apparatus 110c in the ring 1. When the transmission apparatus 110b and the transmission apparatus 110c detect the failure 113, they add, to an OTU frame, failure information indicating that a failure has occurred in the ring 1; switch the route P1 that has been used until now to the route P3 that is used as a spare and that is arranged on the opposite side; and transmit the OTU frame containing the failure information. In a state in which the failure 113 occurs, the transmission apparatus 110a determines whether failure information is contained in one of the OTU frames received from each of the rings 1 to 3 and then determines that the failure information indicating that a failure has occurred in the ring 1 is contained in a OUT frame received from the ring 1. Then, the transmission apparatus 110a maps the OTU frame, which has been received from the ring 1 and has been determined to contain the failure information, onto a shared OTU frame and transmits the mapped shared frame to the line between the transmission apparatus 110a and the transmission apparatus 110e, which are the shared portion. An ODUx that is an ODU in the OTU frame received from the ring 1 is retained in the OPU-Payload in the shared OTU frame (State 21).

In the APS/PCC in the ODU-OH in the shared OTU frame that is in the State 21, the state of the Ring # "1" (ring 1) in which the OTU frame indicated by the MFAS "****0001" is changed from "NR" (normal operation) to "SF" (signal fail).

Due to the shift from the State 20 to the State 21, the failure 113 that has occurred in the ring 1 is recovered and thus the transmission apparatus 110d in the ring 1 can resume sending and receiving an OTU frame to/from the transmission apparatus 110j in the ring 3. For example, an OTU frame sent from the transmission apparatus 110j in the ring 3 reaches the transmission apparatus 110b in the ring 1 via the transmission apparatuses 110i and 110a, turns back at the transmission apparatus 110b, and returns to the transmission apparatus 110a. Then, an OTU frame sent from the transmission apparatus 110j is mapped onto a shared OTU frame by the transmission apparatus 110a, and the mapped shared OTU frame is sent from the transmission apparatus 110a to the transmission apparatus 110e. Then, an OTU frame sent from the transmission apparatus 110j is demapped from the shared OTU frame by the transmission apparatus 110e, reaches the transmission apparatus 110c via the transmission apparatus 110d, turns back at the transmission apparatus 110c, and reaches the transmission apparatus 110d in the ring 1.

As described above, when failure information is contained in an OTU frame received from each ring in a network including a plurality of rings in which a part of each of the plurality of rings is shared, the failure recovery method according to the second embodiment maps the OTU frame containing the failure information received from the ring onto the shared OTU frame. Accordingly, the failure recovery method according to the second embodiment recovers the failure by only using failure information on the existing APS/PCC bytes stored in the OH in the OTU frame. Furthermore, when recovering a failure, there is no need to individually perform a switching process.

Figure 3:
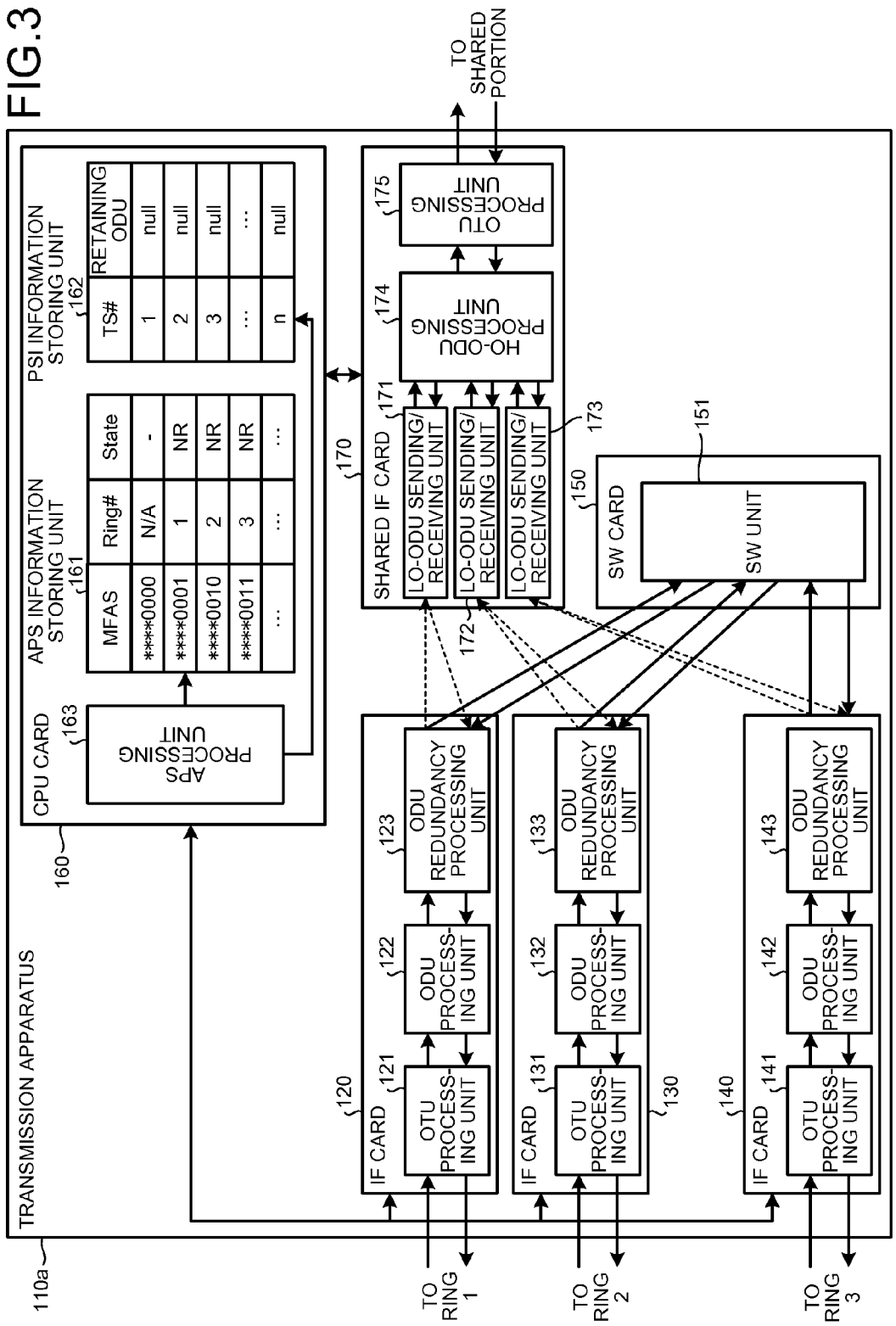
FIG. 3 is a block diagram illustrating the configuration of the transmission apparatus according to the second embodiment.

In the following, the configuration of the transmission apparatus according to the second embodiment will be described. The transmission apparatus 110a and the transmission apparatus 110e illustrated in FIG. 2 have the same configuration; therefore, only the transmission apparatus 110a will be described as an example. FIG. 3 is a block diagram illustrating the configuration of the transmission apparatus 110a according to the second embodiment.

As illustrated in FIG. 3, the transmission apparatus 110a includes an interface (IF) card 120, an IF card 130, an IF card 140, and a switch (SW) card 150. Furthermore, the transmission apparatus 110a includes a central processing unit (CPU) card 160 and a shared IF card 170. In the example in FIG. 3, three IF cards are arranged on a non-shared side; however, the number of IF cards is not limited thereto.

The IF card 120 is a processing unit that performs a process on an OTU frame that is input from the ring 1 or that is output to the ring 1 and that performs a process on an ODU frame that is input from the shared IF card 170 or that is output to the shared IF card 170. The IF card 120 includes an OTU processing unit 121, an ODU processing unit 122, and an ODU redundancy processing unit 123.

When the OTU processing unit 121 receives an OTU frame from the ring 1, it separates the received OTU frame into an ODU frame and an OH, outputs the ODU frame to the ODU processing unit 122, and performs a predetermined process using the OH. Furthermore, when the OTU processing unit 121 receives an ODU frame from the ODU processing unit 122, it creates an OTU frame by adding the OH to the received ODU frame, and outputs the created OTU frame to the ring 1.

The ODU processing unit 122 extracts an APS/PCC from the OH in the ODU frame that is input from the OTU processing unit 121, outputs the extracted APS/PCC to the CPU card 160, and outputs the ODU frame subjected to the extraction to the ODU redundancy processing unit 123. Furthermore, the ODU processing unit 122 delivers the ODU frame, which is input from the ODU redundancy processing unit 123, to the OTU processing unit 121.

If the ODU redundancy processing unit 123 has not received a protection instruction from an APS processing unit 163, i.e., when in the normal operation state, the ODU redundancy processing unit 123 outputs, to the SW card 150, the ODU frame that is input from the ODU processing unit 122. Furthermore, when in the normal operation state, the ODU redundancy processing unit 123 delivers, to the ODU processing unit 122, the ODU frame that is input from the SW card 150.

In contrast, when the ODU redundancy processing unit 123 receives a protection instruction from the APS processing unit 163, i.e., when a failure occurs, the ODU redundancy processing unit 123 outputs, to the SW card 150 and the shared IF card 170, the ODU frame that is input from the ODU processing unit 122. Furthermore, when a failure occurs, the ODU redundancy processing unit 123 delivers, to the ODU processing unit 122, the ODU frames that are input from the SW card 150 and the shared IF card 170.

The IF card 130 is a processing unit that performs a process on an OTU frame that is input from the ring 2 or an OTU frame that is output to the ring 2 and that performs a process on an ODU frame that is input from the shared IF card 170 or an ODU frame that is output to the shared IF card 170. The IF card 130 includes an OTU processing unit 131, an ODU processing unit 132, and an ODU redundancy processing unit 133. The configurations of the OTU processing unit 131, the ODU processing unit 132, and the ODU redundancy processing unit 133 are the same as those of the OTU processing unit 121, the ODU processing unit 122, and the ODU redundancy processing unit 123, respectively; therefore, descriptions thereof will be omitted.

The IF card 140 is a processing unit that performs a process on an OTU frame that is input from the ring 3 and an OTU frame that is output to the ring 3 and that performs a process on an ODU frame that is input from the shared IF card 170 and an ODU frame that is output to the shared IF card 170. The IF card 140 includes an OTU processing unit 141, an ODU processing unit 142, and an ODU redundancy processing unit 143. The configurations of the OTU processing unit 141, the ODU processing unit 142, and the ODU redundancy processing unit 143 are the same as those of the OTU processing unit 121, the ODU processing unit 122, and the ODU redundancy processing unit 123, respectively; therefore, descriptions thereof will be omitted.

The SW card 150 is a processing unit that performs a switching process between different rings. The SW card 150 includes a SW unit 151. The SW unit 151 outputs, to an IF card corresponding to the predetermined transfer destination, an ODU frame that is input from any of the rings 1 to 3 via the corresponding IF cards 120 to 140, respectively. For example, the SW unit 151 outputs, to the IF card 140 that is the predetermined transfer destination, an ODU frame that is input from the ring 1 via the IF card 120.

The CPU card 160 is a control unit that performs the overall management of the failure recovery process performed by the transmission apparatus 110a and includes an APS information storing unit 161, a PSI information storing unit 162, and the APS processing unit 163. The APS processing unit 163 is an example of the determining unit 11 according to the first embodiment.

The APS information storing unit 161 stores therein, for each ring, APS information indicating the state of the ring. Specifically, the APS information storing unit 161 stores therein, items, such as an MFAS, a Ring #, and a State as APS information. The MFAS indicates the type of OTU frame mapped onto a shared OTU frame. The Ring # indicates an identifier for uniquely identifying a ring in which an OTU frame indicated by the MFAS is transmitted. The State indicates the state of the ring identified by the Ring # and contains therein No Request (NR) indicating a normal operation or Signal Fail (SF) indicating signal disconnection.

From the example illustrated in FIG. 3, it can be seen that the State of the Ring # "1" (ring 1), which is indicated by the MFAS of "**0001" and to which an OTU frame is transmitted, is "NR" (normal operation). Furthermore, it can be seen that the State of the Ring # "2" (ring 2), which is indicated by the MFAS "0010" and to which the OTU frame is transmitted, is "NR" (normal operation). Furthermore, it can be seen that the State of the Ring # "3" (ring 3), which is indicated by the MFAS "**0011" and to which the OTU frame is transmitted, is "NR" (normal operation).

The PSI information storing unit 162 stores therein Payload Structure Identifier (PSI) information that is information indicating the type of data retained in the OPU-Payload in a shared OTU frame. Specifically, the PSI information storing unit 162 stores therein items, such as a TS# and a retaining ODU, as PSI information in an associated manner. The TS# indicates an identifier for uniquely identifying a tributary slot (TS) that is a data-retaining region obtained by dividing the OPU-Payload in the shared OTU frame into multiple regions. The retaining ODU indicates an ODU that is actually retained in a TS identified by the TS#.

In the example illustrated in FIG. 3, because a null is stored indicating that no data is retained in all of the TSs #1 to n, it can be seen that no ODU is retained in the OPU-Payload in the shared OTU frame.

The APS processing unit 163 determines whether an OTU frame received from each of the rings 1 to 3 contains failure information indicating that a failure has occurred in one of the rings 1 to 3, respectively. Specifically, the APS processing unit 163 analyzes the APS/PCCs that are input from the ODU processing units 122, 132, and 142 and determines whether, for each OTU frame received from each of the rings 1 to 3, an SF that is failure information representing a signal fail is contained.

If none of the OTU frames contain an SF, the APS processing unit 163 maintains, in the APS information storing unit 161, the State of each Ring # as "NR" (normal operation). Furthermore, the APS processing unit 163 also maintains, in the PSI information storing unit 162, the retaining ODU retained in each TS# as "null".

In contrast, if an SF is contained in any one of the OTU frames received from the rings 1 to 3, the APS processing unit 163 changes, in the APS information storing unit 161, the State of the Ring # that contains the SF from "NR" (normal operation) to "SF" (signal fail). For example, if an SF is contained in an OTU frame received from the ring 1, the APS processing unit 163 changes the State of the Ring # "1" associated with the ring 1 to "SF".

At this time, the APS processing unit 163 changes, in the PSI information storing unit 162, the retaining ODU, which is retained in a TS# that is predetermined in accordance with a Ring # that contains the SF, to an ODU that is actually retained. For example, when an ODUx represents an ODU in an OTU frame received from the ring 1, if the OTU frame contains an SF, the APS processing unit 163 changes, from "null" to "ODUx", the retaining ODUs in the TS#s "1" to "3" defined in accordance with the Ring # "1".

Furthermore, if an SF is contained in any of the OTU frames received from the rings 1 to 3, the APS processing unit 163 outputs a protection instruction that instructs the ODU redundancy processing units 123, 133, and 143 to perform a protection process.

The shared IF card 170 is a processing unit that performs a process on an ODU frame that is input from the IF card 120, 130, or 140 or that is output to the IF card 120, 130, or 140 and that performs a process on a shared OTU frame that is input from a shared portion or output to the shared portion. The shared IF card 170 includes Lower Order (LO)-ODU send/receive units 171 to 173, a Higher Order (HO)-ODU processing unit 174, and an OTU processing unit 175. The HO-ODU processing unit 174 is an example of the mapping unit 12 according to the first embodiment.

The LO-ODU sending/receiving units 171 to 173 output, to the HO-ODU processing unit 174, the ODU frames received from the IF cards 120, 130, and 140, respectively. Furthermore, the LO-ODU sending/receiving units 171 to 173 output, to the IF card 120, 130, 140, respectively, the ODU frames that are input from the HO-ODU processing unit 174.

The HO-ODU processing unit 174 maps an OTU frame, which has been determined by the APS processing unit 163 to contain an SF, onto a shared OTU frame and outputs the mapped shared OTU frame to the OTU processing unit 175. Specifically, the HO-ODU processing unit 174 refers to the APS information storing unit 161 and specifies a ring that is identified by a Ring # in which the State of a ring is "SF" (signal fail). Then, the HO-ODU processing unit 174 maps an ODU frame that is input from the LO-ODU sending/receiving unit associated with the specified ring onto the OPU-Payload in a shared OTU frame that is indicated by the TS# in the PSI information storing unit 162. Then, the HO-ODU processing unit 174 outputs, to the OTU processing unit 175, the shared OTU frame onto which the ODU frame is mapped.

For example, if the State of a ring indicated by the Ring # "1" (ring 1) is "SF" (signal fail) in the APS information storing unit 161, the HO-ODU processing unit 174 specifies the ring 1 identified by the Ring # "1". Then, the HO-ODU processing unit 174 maps an ODU frame that is input from the LO-ODU sending/receiving unit 171 associated with the ring 1 onto the OPU-Payload in a shared OTU frame indicated by the TS#s "1" to "3" in the PSI information storing unit 162. Then, the HO-ODU processing unit 174 outputs, to the OTU processing unit 175, the shared OTU frame onto which the ODU frame is mapped.

Furthermore, the HO-ODU processing unit 174 demaps the ODU frame, which has been determined by the APS processing unit 163 to contain an SF, from a shared ODU frame that will be described later and that is input from the OTU processing unit 175. Then, the HO-ODU processing unit 174 outputs, to the LO-ODU sending/receiving units 171 to 173, the demapped ODU frame.

The OTU processing unit 175 stores various kinds of operation management information in an OH in a shared OTU frame that is input from the HO-ODU processing unit 174 and then outputs, to a shared portion, a shared OTU frame containing the operation management information. Furthermore, if the OTU processing unit 175 receives a shared OTU frame from a shared portion, the OTU processing unit 175 separates the received shared OTU frame into an ODU frame and an OH and outputs the split ODU frame (hereinafter, referred to as "shared ODU frame") to the HO-ODU processing unit 174. Furthermore, the OTU processing unit 175 performs a predetermined process using the separated OH.

Figure 4:
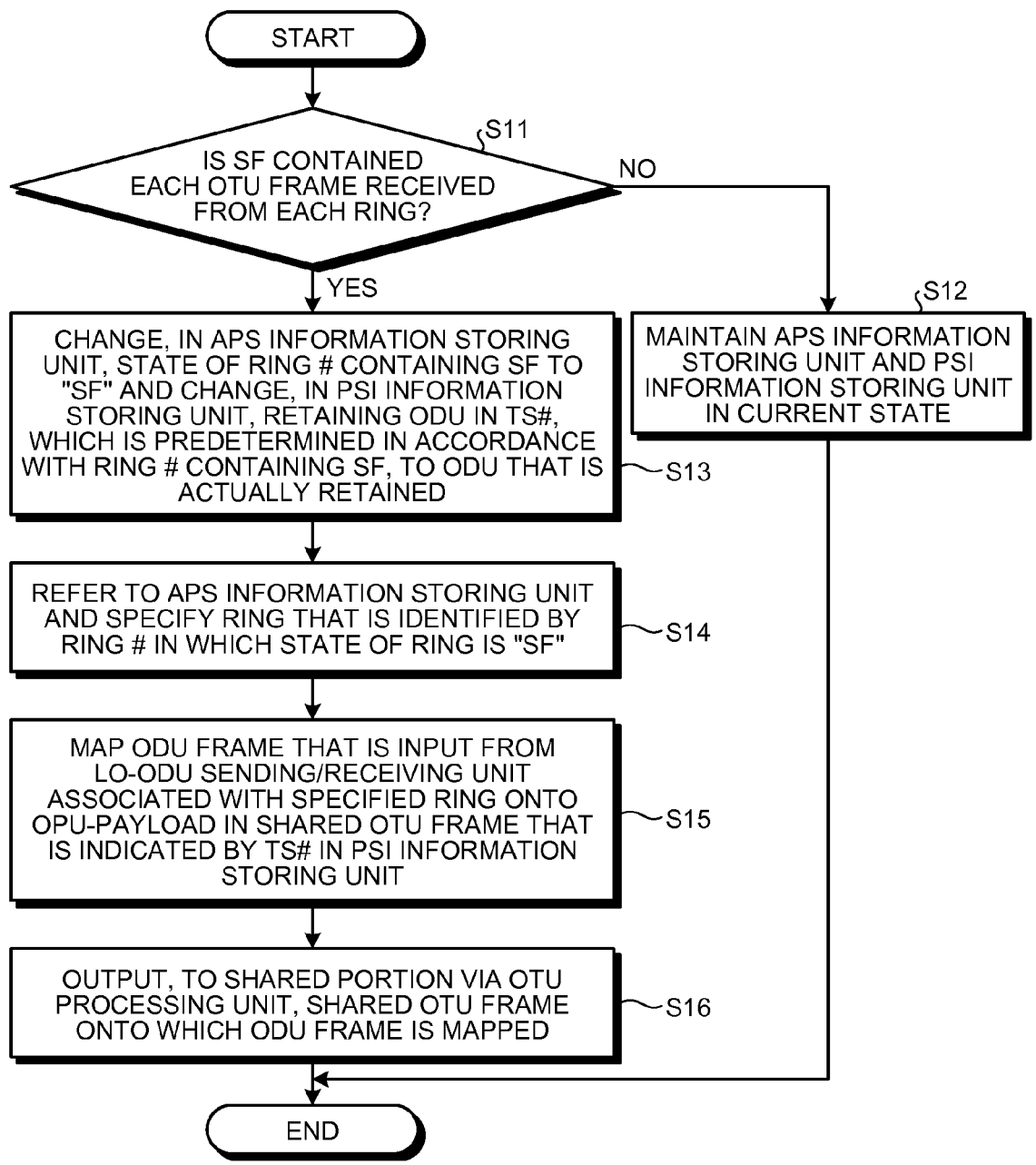
FIG. 4 is a flowchart illustrating the flow of a process performed by the transmission apparatus according to the second embodiment.

In the following, the flow of a process performed by the transmission apparatus according to the second embodiment will be described. FIG. 4 is a flowchart illustrating the flow of a process performed by the transmission apparatus 110a according to the second embodiment. The flow of a process performed by the CPU card 160 and the shared IF card 170 in the transmission apparatus 110a will be described below with reference to FIG. 4.

As illustrated in FIG. 4, the APS processing unit 163 in the CPU card 160 analyzes the APS/PCC that is input from each of the ODU processing units 122, 132, and 142 and determines, for each OTU frame received from each of the rings 1 to 3, whether an SF is contained (Step S11).

If none of the OTU frames contain an SF (No at Step S11), the APS processing unit 163 maintains the APS information storing unit 161 and the PSI information storing unit 162 in their respective current state (Step S12) and ends the process. Specifically, the APS processing unit 163 maintains, in the APS information storing unit 161, the State of each Ring # as "NR" (normal operation) and also maintains, in the PSI information storing unit 162, a retaining ODU in each TS# as "null".

In contrast, if an SF is contained in any one of the OTU frames received from the rings 1 to 3 (Yes at Step S11), the APS processing unit 163 changes, in the APS information storing unit 161, the State of the Ring # that contains the SF to "SF" (signal fail). Furthermore, the APS processing unit 163 also changes, in the PSI information storing unit 162, a retaining ODU in a TS#, which is predetermined in accordance with the Ring # that contains the SF, to an ODU that is actually retained (Step S13).

For example, if an SF is contained in an OTU frame received from the ring 1, the APS processing unit 163 changes the State of the Ring # "1" associated with the ring 1 from "NR" (normal operation) to "SF" (signal fail). Furthermore, the APS processing unit 163 also changes, from "null" to "ODUx", the retaining ODUs in the TS#s "1" to "3" defined in accordance with the Ring # "1".

Subsequently, the HO-ODU processing unit 174 in the shared IF card 170 refers to the APS information storing unit 161 and specifies a ring that is identified by the Ring # in which the State of the ring is "SF" (signal fail) (Step S14). Then, the HO-ODU processing unit 174 maps an ODU frame that is input from the LO-ODU sending/receiving unit associated with the specified ring onto the OPU-Payload in a shared OTU frame that is indicated by the TS# in the PSI information storing unit 162 (Step S15). Then, the HO-ODU processing unit 174 outputs, to a shared portion via the OTU processing unit 175, the shared OTU frame onto which the ODU frame is mapped (Step S16).

For example, if the State of a ring indicated by the Ring # "1" (ring 1) is "SF" (signal fail) in the APS information storing unit 161, the HO-ODU processing unit 174 specifies the ring 1 identified by the Ring # "1". Then, the HO-ODU processing unit 174 maps an ODU frame that is input from the LO-ODU sending/receiving unit 171 associated with the ring 1 onto the OPU-Payload in a shared OTU frame indicated by the TS#s "1" to "3" in the PSI information storing unit 162. Then, the HO-ODU processing unit 174 outputs, to the shared portion via the OTU processing unit 175, the shared OTU frame onto which the ODU frame is mapped.

As described above, when an SF is contained in an OTU frame received from each of the rings in a network including a plurality of rings in which a part of each of the plurality of rings is shared, the transmission apparatus 110a maps the OTU frame received from the ring that contains the SF onto the shared OTU frame. Accordingly, the transmission apparatus 110a can recover a failure by using only failure information on the existing APS/PCC bytes stored in the OH in the OTU frame, and thus it is possible to skip the switching process individually performed in the conventional multi-ring configuration. Accordingly, the transmission apparatus 110a can simplify the process performed due to a failure recovery.

[c] Third Embodiment

In the second embodiment, a description has been given of an example in which an OTU frame that is determined to contain an SF is mapped onto a shared OTU frame and the mapped shared OTU frame is output to a shared portion. However, the configuration is not limited thereto. For example, a part of an OTU frame that is determined not to contain an SF may also be previously mapped onto a shared OTU frame and, if it is determined that an SF is contained in the OTU frame, a part of the previously mapped OTU frame may also be expanded. Accordingly, in a third embodiment, a description will be given of a case in which a part of an OTU frame that is determined not to contain an SF is mapped onto a shared OTU frame and, if it is determined that an SF is contained in the OTU frame, a part of the previously mapped OTU frame is expanded.

Figure 5:
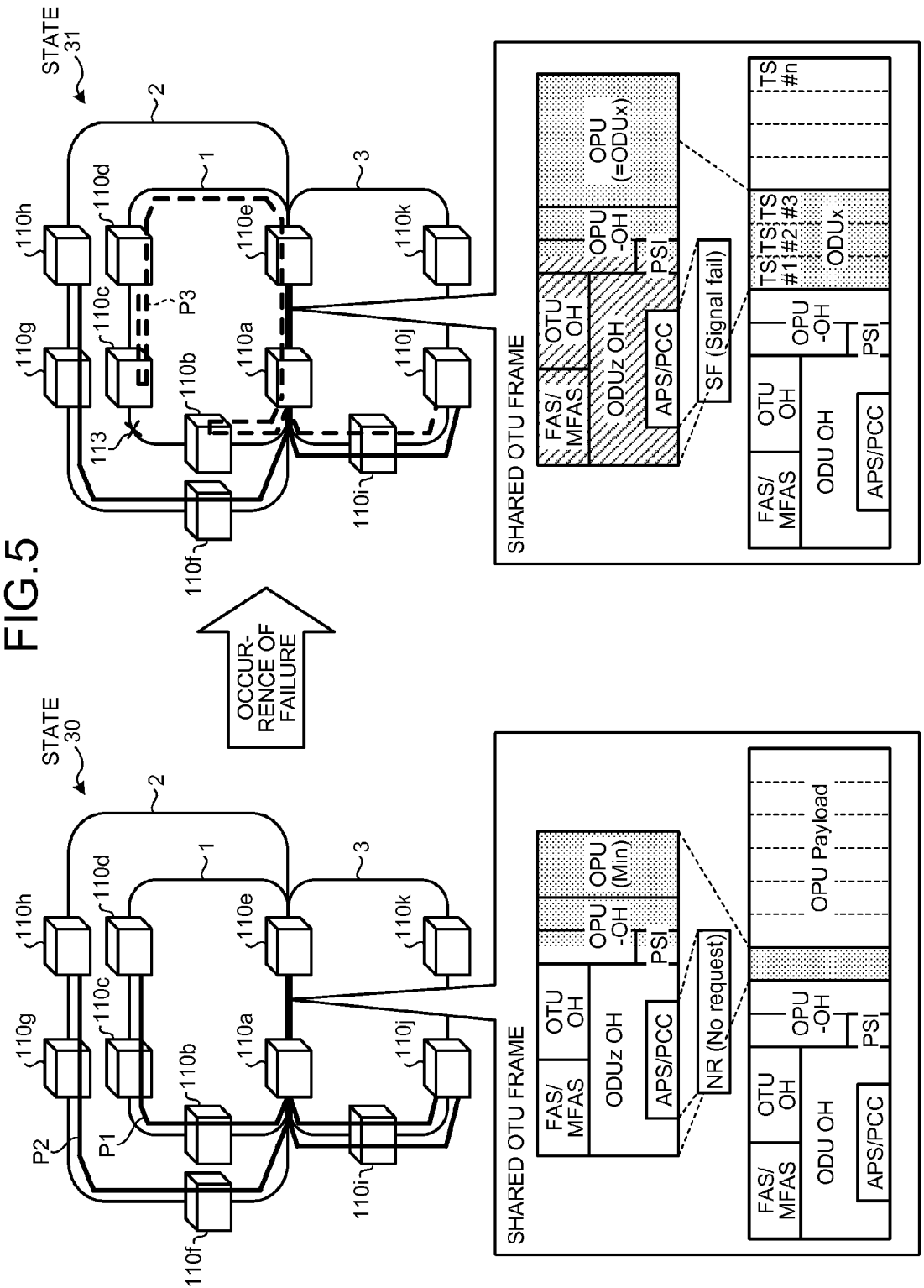
FIG. 5 is a schematic diagram illustrating a failure recovery method performed by a transmission apparatus according to a third embodiment.

First, a failure recovery method performed by a transmission apparatus according to the third embodiment will be described. FIG. 5 is a schematic diagram illustrating a failure recovery method performed by a transmission apparatus according to a third embodiment. In the following, components having the same function as those described with reference to FIG. 2 are assigned the same reference numerals; therefore, a description thereof in detail is omitted.

The network illustrated in FIG. 5 shares the section between the transmission apparatus 110a and the transmission apparatus 110e in the rings 1 to 3. Both the transmission apparatus 110a and the transmission apparatus 110e that are arranged in a shared portion are the transmission apparatuses that perform the failure recovery method according to the third embodiment. The other transmission apparatuses are known transmission apparatuses used for an APS/BLSR ring network. The transmission apparatus 110a and the transmission apparatus 110e according to the third embodiment have the same configuration; therefore, in the following, only the transmission apparatus 110a will be described as an example.

In the failure recovery method according to the third embodiment, a part of an OTU frame that is determined not to contain an SF is previously mapped onto a shared OTU frame and, if it is determined that an SF is contained in the OTU frame, a part of the previously mapped OTU frame is expanded.

In the normal operation, the transmission apparatus 110a determines whether an SF is contained in an OTU frame received from each of the rings 1 to 3 and then determines that an SF is not contained. The transmission apparatus 110a according to the third embodiment previously maps a part of the OTU frame that is determined not to contain an SF onto a shared OTU frame used in a line between the transmission apparatus 110a and the transmission apparatus 110e, which are a shared portion (State 30).

For example, if the transmission apparatus 110a determines that an SF is not contained in an OTU frame received from the ring 1, the transmission apparatus 110a previously maps a part of the OTU frame received from the ring 1 onto the shared OTU frame.

In the above example, it is assumed that the failure 113, such as an SF, has occurred in a line between the transmission apparatus 110b and the transmission apparatus 110c in the ring 1. When the transmission apparatus 110b and the transmission apparatus 110c detect the failure 113, they add, to an OTU frame, failure information indicating that a failure has occurred in the ring 1; switch the route P1 that has been used until now to the route P3 that is used as a spare and that is arranged on the opposite side; and transmit the OTU frame containing the failure information. In this state in which the failure 113 occurs, the transmission apparatus 110a determines whether failure information is contained in an OTU frame received from each of the rings 1 to 3 and then determines that failure information is contained indicating that a failure has occurred in the ring 1. Then, the transmission apparatus 110a expands a part of the OTU frame previously mapped onto the shared OTU frame, and thereby the OTU frame is mapped onto the shared OTU frame. An ODUx that is the ODU in the OTU frame received from the ring 1 is retained in the OPU-Payload in the shared OTU frame (State 31).

Due to the shift from the State 30 to the State 31, the failure 113 that has occurred in the ring 1 is recovered and thus the transmission apparatus 110d in the ring 1 can resume sending and receiving an OTU frame to/from the transmission apparatus 110j in the ring 3.

As described above, the failure recovery method according to the third embodiment previously maps a part of the OTU frame that is determined not to contain an SF onto a shared OTU frame and expands, if it is determined that an SF is contained in the OTU frame, a part of the previously mapped OTU frame. Accordingly, the failure recovery method according to the third embodiment efficiently maps an OTU frame received from a ring containing an SF onto a shared OTU frame.

Figure 6:
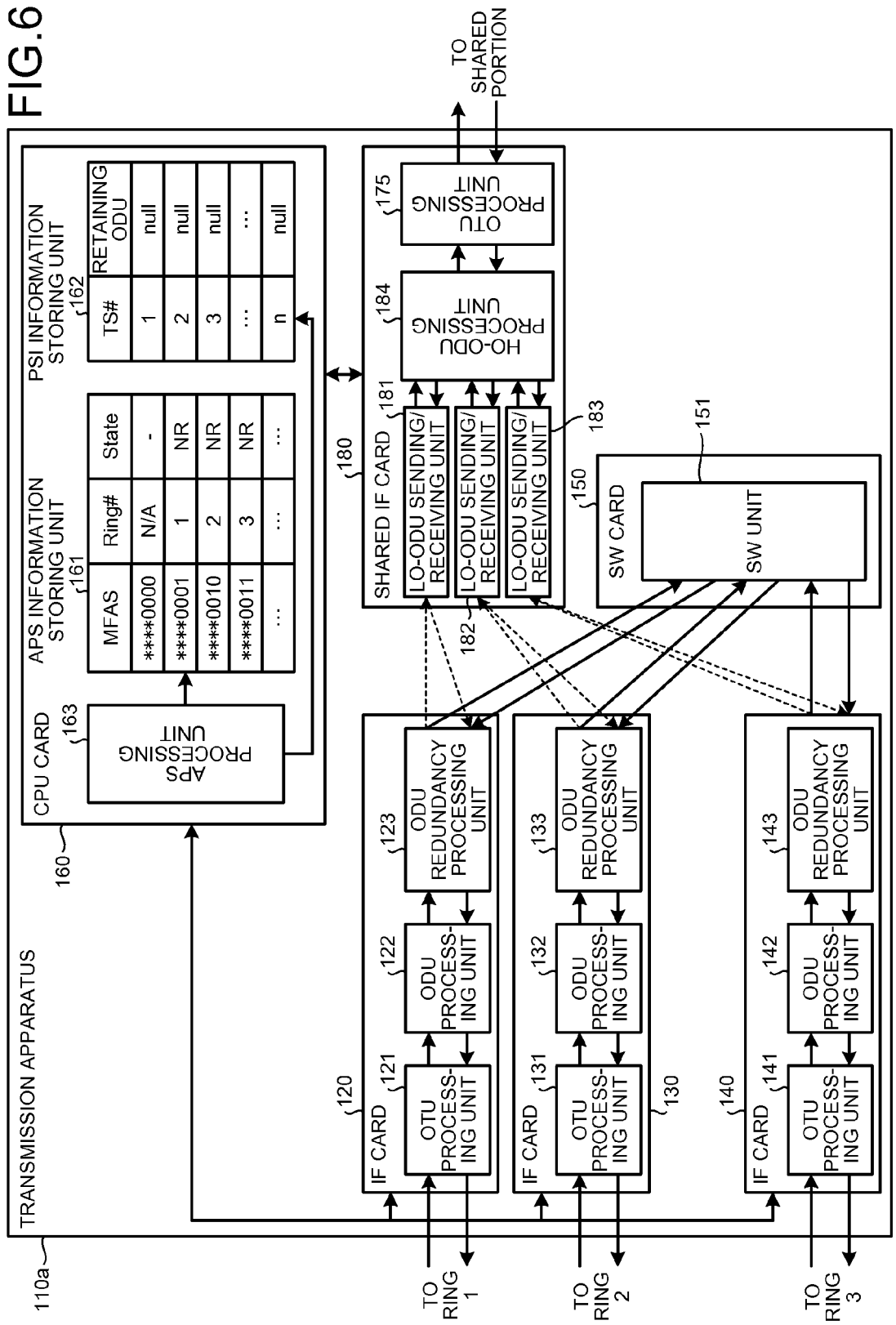
FIG. 6 is a block diagram illustrating the configuration of the transmission apparatus according to the third embodiment.

In the following, the configuration of the transmission apparatus according to the third embodiment will be described. The transmission apparatus 110a and the transmission apparatus 110e illustrated in FIG. 5 have the same configuration; therefore, only the transmission apparatus 110a will be described as an example. FIG. 6 is a block diagram illustrating the configuration of the transmission apparatus 110a according to the third embodiment. Furthermore, in the following, components having the same function as those described with reference to FIG. 3 are assigned the same reference numerals; therefore, a description thereof in detail is omitted.

As illustrated in FIG. 6, the transmission apparatus 110a includes a shared IF card 180 instead of the shared IF card 170 illustrated in FIG. 3. The shared IF card 180 is a processing unit that performs a process on an ODU frame that is input from the IF cards 120, 130, or 140 or that is output to the IF card 120, 130, or 140 and that performs a process on a shared OTU frame that is input from a shared portion or output to the shared portion. The shared IF card 180 includes LO-ODU sending/receiving units 181 to 183, an HO-ODU processing unit 184, and the OTU processing unit 175. The LO-ODU sending/receiving units 181 to 183 and the HO-ODU processing unit 184 are an example of the mapping unit 12 according to the first embodiment.

The LO-ODU sending/receiving units 181 to 183 output, to the HO-ODU processing unit 184, the ODU frames received from the IF cards 120, 130, and 140, respectively. Furthermore, the LO-ODU sending/receiving units 181 to 183 output, to the IF card 120, 130, and 140, respectively, the ODU frames that are input from the HO-ODU processing unit 184.

Furthermore, the LO-ODU sending/receiving units 181 to 183 previously map a part of an OTU frame, which is determined by the APS processing unit 163 not to contain an SF, onto a shared OTU frame. Specifically, the LO-ODU sending/receiving units 181 to 183 refer to the APS information storing unit 161 and specify a ring identified by a Ring # in which the State of a ring is "NR" (normal operation). Then, the LO-ODU sending/receiving units 181 to 183 previously map a part of the OTU frame received from the specified ring onto a shared OTU frame.

If the APS processing unit 163 determines that an SF is contained, the HO-ODU processing unit 184 expands a part of the OTU frame that is previously mapped onto the shared OTU frame and outputs the expanded shared OTU frame to the OTU processing unit 175. Specifically, the HO-ODU processing unit 184 refers to the APS information storing unit 161 and specifies a ring that is identified by a Ring # in which the State of a ring is "SF" (signal fail). Then, the HO-ODU processing unit 184 expands a part of the OTU frame that is previously mapped onto the shared OTU frame that is indicated by a TS# in the PSI information storing unit 162. Then, the HO-ODU processing unit 184 outputs, to the OTU processing unit 175, the shared OTU frame obtained by expanding a part of the OTU frame.

Furthermore, the HO-ODU processing unit 184 demaps an ODU frame, which is determined by the APS processing unit 163 to contain an SF, from a shared ODU frame that is input from the OTU processing unit 175. Then, the HO-ODU processing unit 184 outputs the demapped ODU frame to the LO-ODU sending/receiving units 181 to 183.

Figure 7:
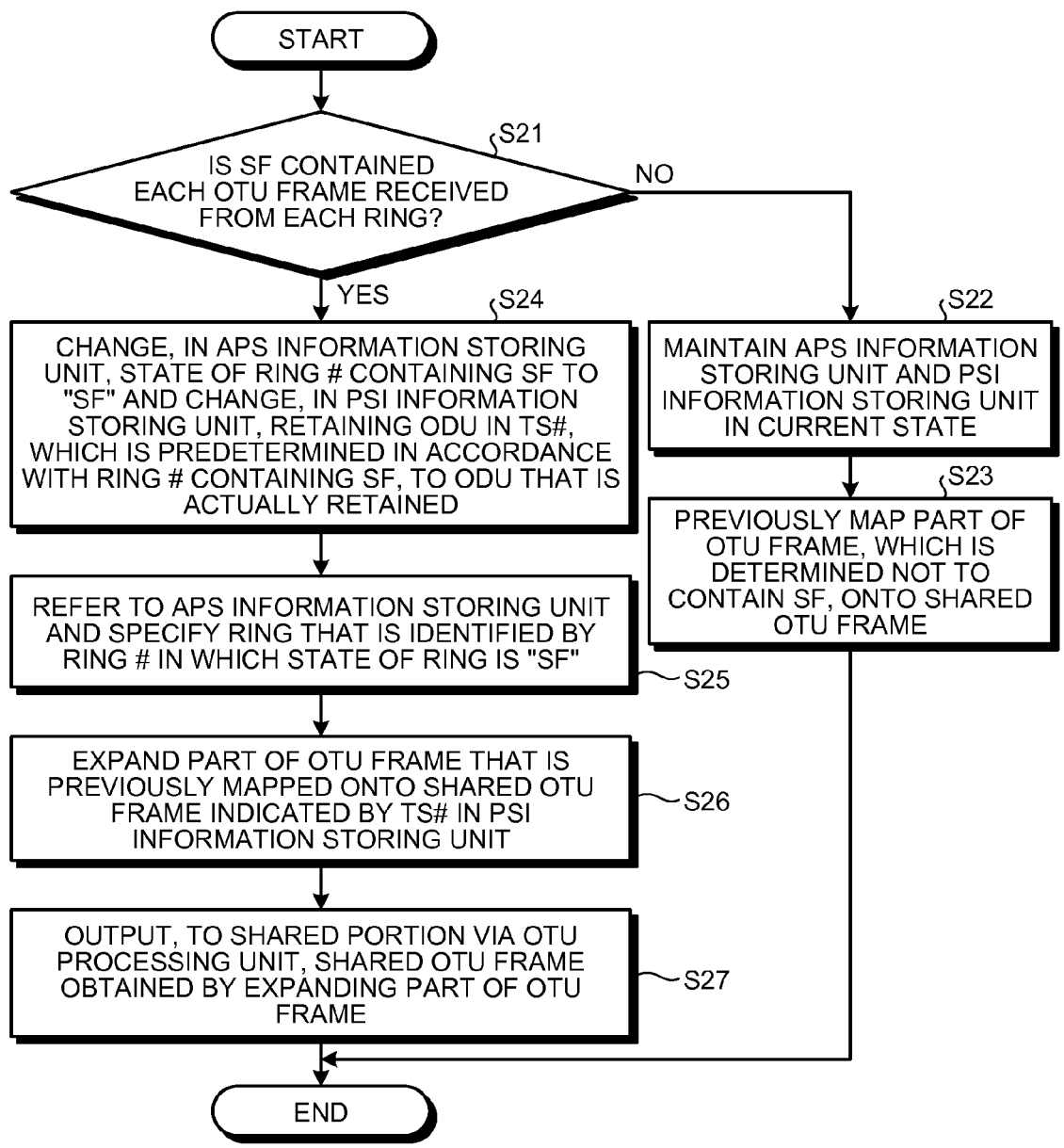
FIG. 7 is a flowchart illustrating the flow of a process performed by the transmission apparatus according to the third embodiment.

In the following, the flow of a process performed by the transmission apparatus according to the third embodiment will be described. FIG. 7 is a flowchart illustrating the flow of a process performed by the transmission apparatus 110a according to the third embodiment. The flow of the process performed by the transmission apparatus 110a, the CPU card 160, and the shared IF card 180 will be described with reference to FIG. 7.

As illustrated in FIG. 7, the APS processing unit 163 in the CPU card 160 analyzes the APS/PCC that is input from each of the ODU processing units 122, 132, and 142 and determines, for each OTU frame received from each of the rings 1 to 3, whether an SF is contained (Step S21).

If none of the OTU frames contain an SF (No at Step S21), the APS processing unit 163 maintains the APS information storing unit 161 and the PSI information storing unit 162 in their respective current state (Step S22). Specifically, the APS processing unit 163 maintains, in the APS information storing unit 161, the State of each Ring # as "NR" (normal operation) and maintains, in the PSI information storing unit 162, a retaining ODU in each TS# as "null". Then, the LO-ODU sending/receiving units 181 to 183 in the shared IF card 180 previously map a part of an OTU frame, which is determined by the APS processing unit 163 not to contain an SF, onto a shared OTU frame (Step S23).

In contrast, if an SF is contained in any one of the OTU frames received from the rings 1 to 3 (Yes at Step S21), the APS processing unit 163 changes, in the APS information storing unit 161, the State of the Ring # that contains the SF to "SF" (signal fail). At the same time, the APS processing unit 163 changes, in the PSI information storing unit 162, the retaining ODU, which is retained in a TS# that is predetermined in accordance with a Ring # that contains the SF, to an ODU that is actually retained (Step S24).

For example, if an SF is contained in an OTU frame received from the ring 1, the APS processing unit 163 changes the State of the Ring # "1" that is associated with the ring 1 from "NR" (normal operation) to "SF" (signal fail). Furthermore, the APS processing unit 163 also changes, from "null" to "ODUx", the retaining ODU in the TS#s "1" to "3" defined in accordance with the Ring # "1".

Subsequently, the HO-ODU processing unit 184 in the shared IF card 180 refers to the APS information storing unit 161 and specifies a ring that is identified by a Ring # in which the State of a ring is "SF" (signal fail) (Step S25). Then, the HO-ODU processing unit 184 expands a part of an OTU frame that is previously mapped onto a shared OTU frame indicated by a TS# in the PSI information storing unit 162 (Step S26). Then, the HO-ODU processing unit 184 outputs, to a shared portion via the OTU processing unit 175, the shared OTU frame obtained by expanding the part of the OTU frame (Step S27).

As described above, the transmission apparatus 110a previously maps a part of an OTU frame that is determined not to contain an SF onto a shared OTU frame and expands, if it is determined that an SF is contained in the OTU frame, the part of the OTU frame that is previously mapped. Accordingly, the transmission apparatus 110a can efficiently map an OTU frame received from a ring containing an SF onto a shared OTU frame.

The embodiments of the present invention have been described; however, the present invention may also be implemented with various kinds of embodiments other than the embodiments described above within the scope of the technical ideas described in the claims.

For example, in the second and the third embodiments, a description has been given of a case in which the section between the transmission apparatus 110a and the transmission apparatus 110e, which is a shared portion, is connected by a single link; however, the configuration is not limited thereto. In the following, another configuration of the transmission apparatus 110a will be described with reference to FIG. 8.

Figure 8:
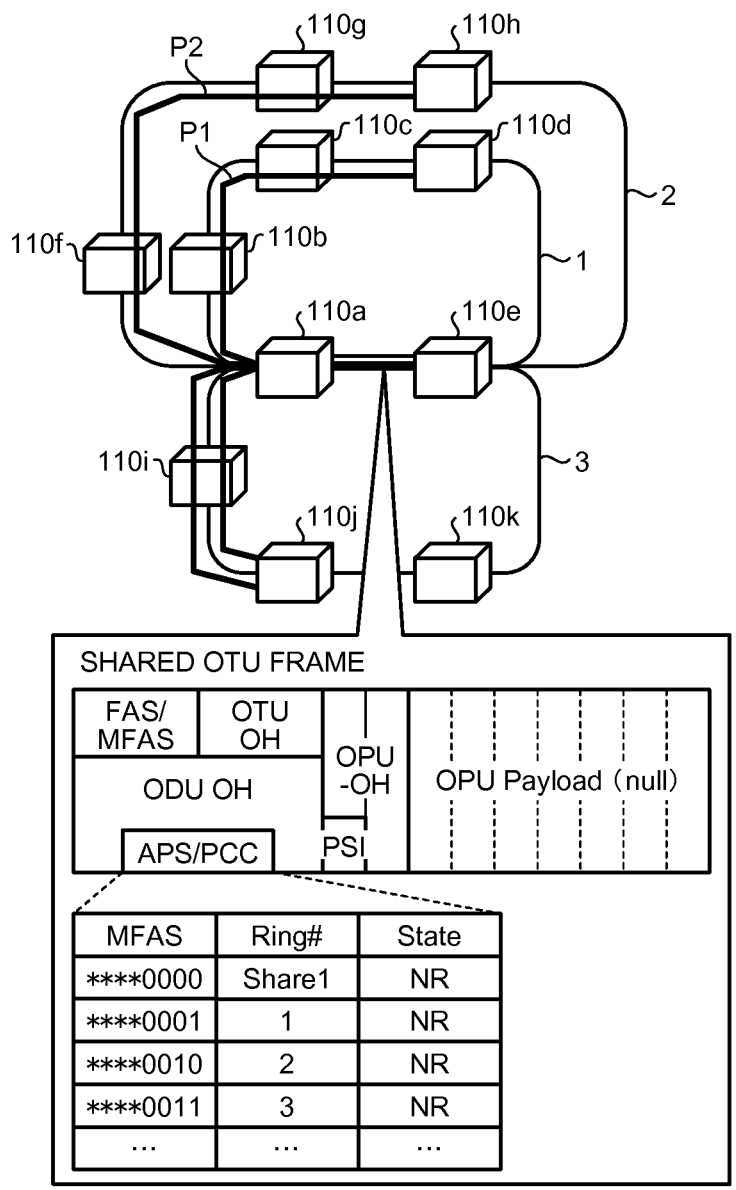
FIG. 8 is a schematic diagram illustrating configuration example 1 of the transmission apparatus.

FIG. 8 is a schematic diagram illustrating configuration example 1 of the transmission apparatus 110a. As illustrated in FIG. 8, the section between the transmission apparatus 110a and the transmission apparatus 110e, which is a shared portion, may also be connected by two parallel links. In such a case, for the APS/PCC in the ODU-OH in the shared OTU frame, a shared OTU frame is defined in the MFAS "**0000" and one out of two links associated with a Ring # is defined in the "Share 1". With such a configuration 1, if the State of the Ring # "Share 1" (one link) in which a shared OTU frame indicated by the MFAS "**0000" is transmitted changes from "NR" (normal operation) to "SF" (signal fail), the shared OTU frame is forcedly output to the other link. Specifically, with the transmission apparatus 110a according to configuration example 1, a determining unit determines, in a shared OTU frame that is a shared portion and that is received from one of the two parallel links that connect the section between the transmission apparatus 110a and the transmission apparatus 110e, whether failure information indicating that a failure has occurred in one of the two links is contained. Then, a mapping unit maps a shared OTU frame, which is determined by the determining unit to contain the failure information, onto the shared OTU frame that is used by the link other than the link in which the failure has occurred. Therefore, according to the configuration example 1, it is possible to provide link redundancy across the section between the transmission apparatus 110a and the transmission apparatus 110e, which is a shared portion. In the example illustrated in FIG. 8, the section between the transmission apparatus 110a and the transmission apparatus 110e, which is a shared portion, is connected by two parallel links; however, the number of links that connects a shared portion may also be two or more.

Furthermore, in the second and the third embodiments, the transmission apparatus 110a outputs an OTU frame to the transmission apparatus 110b located closer to the failure 113 that has occurred in the ring 1 and receives an OTU frame that turns back at the transmission apparatus 110b; however, the configuration is not limited thereto. In the following, another configuration of the transmission apparatus 110a will be described with reference to FIG. 9.

Figure 9:
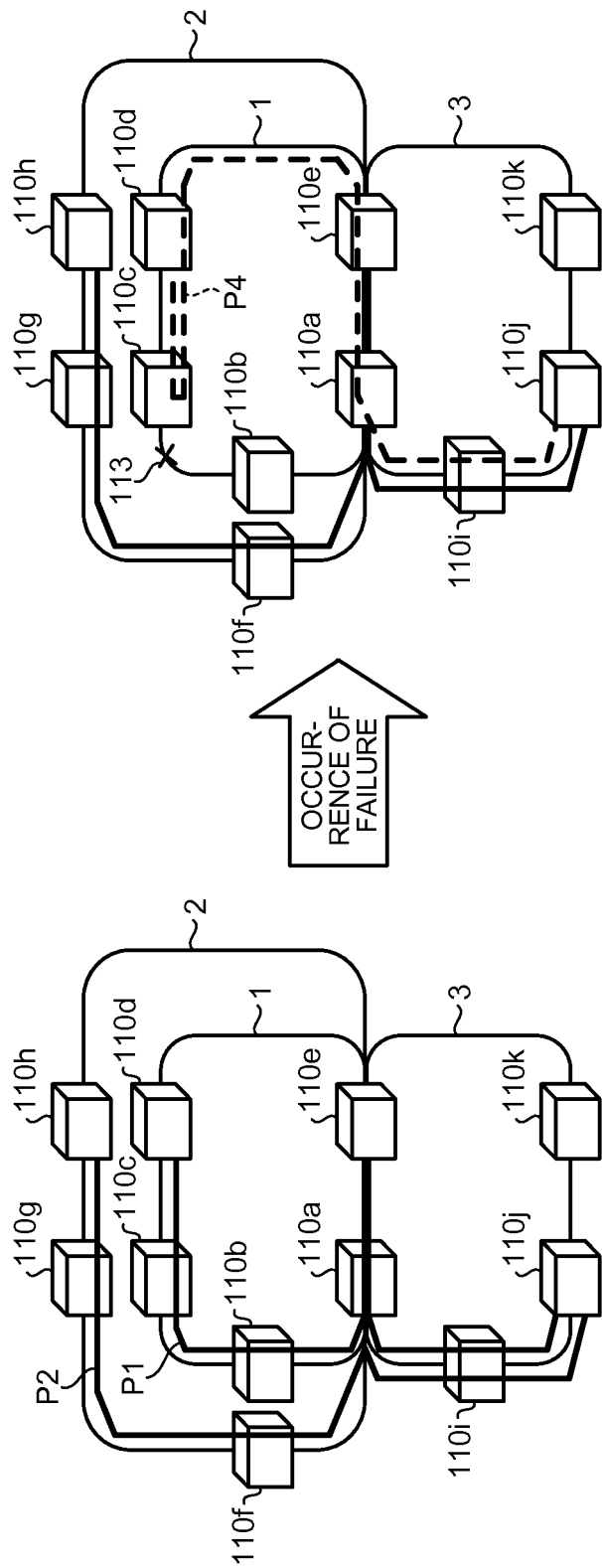
FIG. 9 is a schematic diagram illustrating configuration example 2 of the transmission apparatus.

FIG. 9 is a schematic diagram illustrating configuration example 2 of the transmission apparatus 110a. As illustrated in FIG. 9, the transmission apparatus 110a may also output an OTU frame to the transmission apparatus 110i in the ring 3 instead of the transmission apparatus 110b located closer to the failure 113 that has occurred in the ring 1. The failure detection failure and a change in the output destination of an OTU frame can be implemented by using a Tandem Connection Monitoring (TCM) function as prescribed by G.709.

Figure 10:
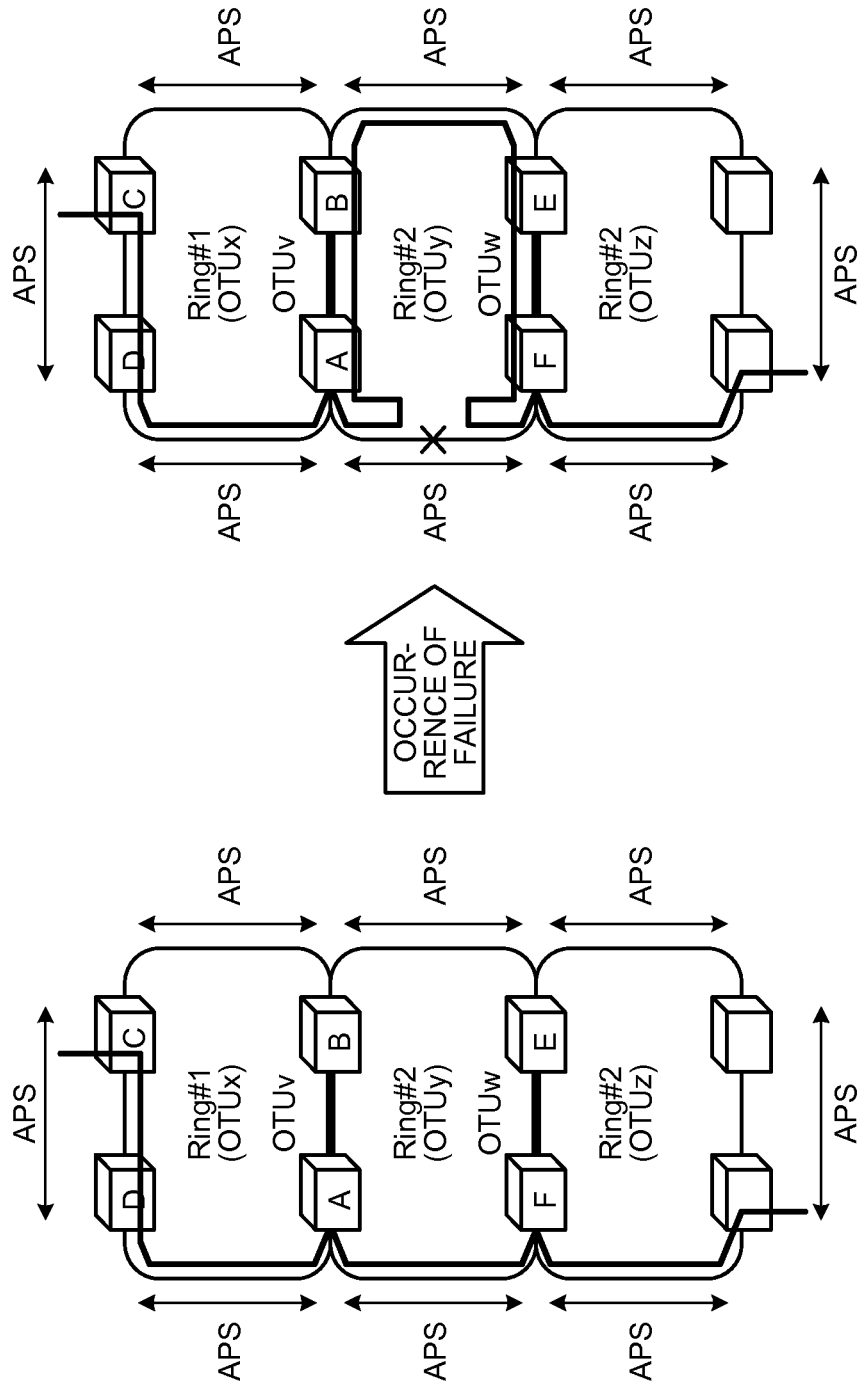
FIG. 10 is a schematic diagram illustrating configuration example 3 of the transmission apparatus.
Figure 11:
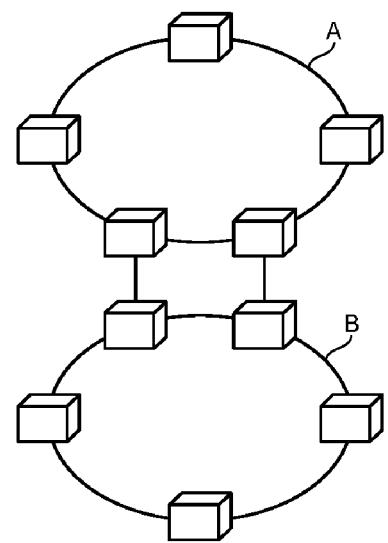
FIG. 11 is a schematic diagram illustrating a conventional multi-ring configuration.

Furthermore, in the second and the third embodiments, a case has been described in which the transmission apparatus disclosed in the present invention is used for the transmission apparatus 110a and the transmission apparatus 110e that are arranged in a single shared portion in a multi-ring configuration that includes three rings 1 to 3; however, the configuration is not limited thereto. For example, the transmission apparatus disclosed in the present invention may also be used for transmission apparatuses A, B, F, and E, as illustrated in FIG. 10, that are arranged in two shared portions in the multiring configuration. FIG. 10 is a schematic diagram illustrating configuration example 3 of the transmission apparatus.

Of the processes described in the embodiments, the whole or a part of the processes that are mentioned as being automatically performed can also be manually performed. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

The various processes described in the above embodiments can be implemented by programs prepared in advance and executed by a computer such as a personal computer or a workstation. The program can be distributed via a network, such as the Internet. Furthermore, the program can be stored in a computer-readable recording medium, such as a hard disc drive, a flexible disk (FD), a compact disc read only memory (CD-ROM), a magneto optical disc (MO), and a digital versatile disc (DVD). Furthermore, the program can also be implemented by a computer reading it from the recording medium.

According to an aspect of the transmission apparatus disclosed in the present invention, an advantage is provided in that a process performed due to failure recovery can be simplified.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission apparatus comprising:
a central processing unit card that determines, when a frame is received from each of a plurality of rings in a network including the plurality of rings in which a part of each of the plurality of rings is shared, whether failure information indicating that a failure has occurred in one of the plurality of the rings is contained in one of the received frames; and
a shared interface card that maps the received frame that is determined by the central processing unit card to contain the failure information onto a shared frame, which is an Optical channel Transport Unit (OTU) frame used in the shared part of each of the plurality of rings and which has a plurality of data-retaining regions, each of the plurality of data-retaining regions being associated with each of the plurality of the rings, wherein
the received frame that is determined to contain the failure information is mapped onto, among the plurality of data-retaining regions, a data-retaining region which is associated with the one of the plurality of the rings, and
the plurality of data-retaining regions is a plurality of tributary slots included in the OTU frame.

2. The transmission apparatus according to claim 1, wherein
the shared interface card previously maps a part of the received frame that is determined by the central processing unit card not to contain the failure information onto the shared frame, and
when it is determined by the central processing unit card that the failure information is contained in the received frame, the shared interface card maps the received frame onto the shared frame by expanding the part of the received frame that has been previously mapped onto the shared frame.

3. The transmission apparatus according to claim 1, wherein
the shared part of each of the plurality of rings includes a plurality of parallel links,
the central processing unit card determines whether a frame received from one link out of the plurality of parallel links contains failure information indicating that a failure has occurred in the one link, and the shared interface card maps the frame that is determined by the central processing unit card to contain the failure information onto a frame that is used in a link that is from among the plurality of parallel links and that is other than the one link in which the failure has occurred.

4. A failure recovery method:

causing a transmission apparatus to perform, determining, when a frame is received from each of a plurality of rings in a network including the plurality of rings in which a part of each of the plurality of rings is shared, whether failure information indicating that a failure has occurred in one of the plurality of the rings is contained in one of the received frames, and mapping the received frame that is determined at the determining to contain the failure information onto a shared frame, which is an Optical channel Transport Unit (OTU) frame used in the shared part of each of the plurality of rings and which has a plurality of data-retaining regions, each of the plurality of data-retaining regions being associated with each of the plurality of the rings, wherein the received frame that is determined to contain the failure information is mapped onto, among the plurality of data-retaining regions, a data-retaining region which is associated with the one of the plurality of the rings, and the plurality of data-retaining regions is a plurality of tributary slots included in the OTU frame.

5. The failure recovery method according to claim 4, wherein the mapping includes mapping, in advance, a part of the received frame that is determined not to contain the failure information at the determining onto the shared frame, and when it is determined at the determining that the failure information is contained in the received frame, the mapping includes mapping the received frame onto the shared frame by expanding the part of the received frame that has been previously mapped onto the shared frame.

6. The failure recovery method according to claim 4, wherein the shared part of each of the plurality of rings includes a plurality of parallel links, the determining includes determining whether a frame received from one link out of the plurality of parallel links contains failure information indicating that a failure has occurred in the one link, and the mapping includes mapping the frame that is determined at the determining to contain the failure information onto a frame that is used in a link that is from among the plurality of parallel links and that is other than the one link in which the failure has occurred.

7. A network system including a plurality of rings in which a part of each of the plurality of rings is shared, the network system comprising transmission apparatuses that are connected to different ends of the shared part of each of the plurality of rings, respectively, wherein each of the transmission apparatus includes a central processing unit card that determines, when a frame is received from each of the plurality of rings, whether failure information indicating that a failure has occurred in one of the plurality of the rings is contained in one of the received frames, and a shared interface card that maps the received frame that is determined by the central processing unit card to contain the failure information onto a shared frame, which is an Optical channel Transport Unit (OTU) frame used in the shared part of each of the plurality of rings and which has a plurality of data-retaining regions, each of the plurality of data-retaining regions being associated with each of the plurality of the rings, wherein the received frame that is determined to contain the failure information is mapped onto, among the plurality of data-retaining regions, a data-retaining region which is associated with the one of the plurality of the rings, and the plurality of data-retaining regions is a plurality of tributary slots included in the OTU frame.

8. The network system according to claim 7, wherein the shared interface card previously maps a part of the received frame that is determined at the determining not to contain the failure information onto the shared frame, and when it is determined by the central processing unit card that the failure information is contained in the received frame, the shared interface card maps the received frame onto the shared frame by expanding the part of the received frame that has been previously mapped onto the shared frame.

9. The network system according to claim 7, wherein the shared part of each of the plurality of rings includes a plurality of parallel links, the central processing unit card determines whether a frame received from one link out of the plurality of parallel links contains failure information indicating that a failure has occurred in the one link, and the shared interface card maps the frame that is determined by the central processing unit card to contain the failure information onto a frame that is used in a link that is from among the plurality of parallel links and that is other than the one link in which the failure has occurred.

* * * * *